March 18, 1952 — N. KAPLAN — 2,589,701
FISH CONVEYER
Filed April 9, 1947 — 5 Sheets-Sheet 1
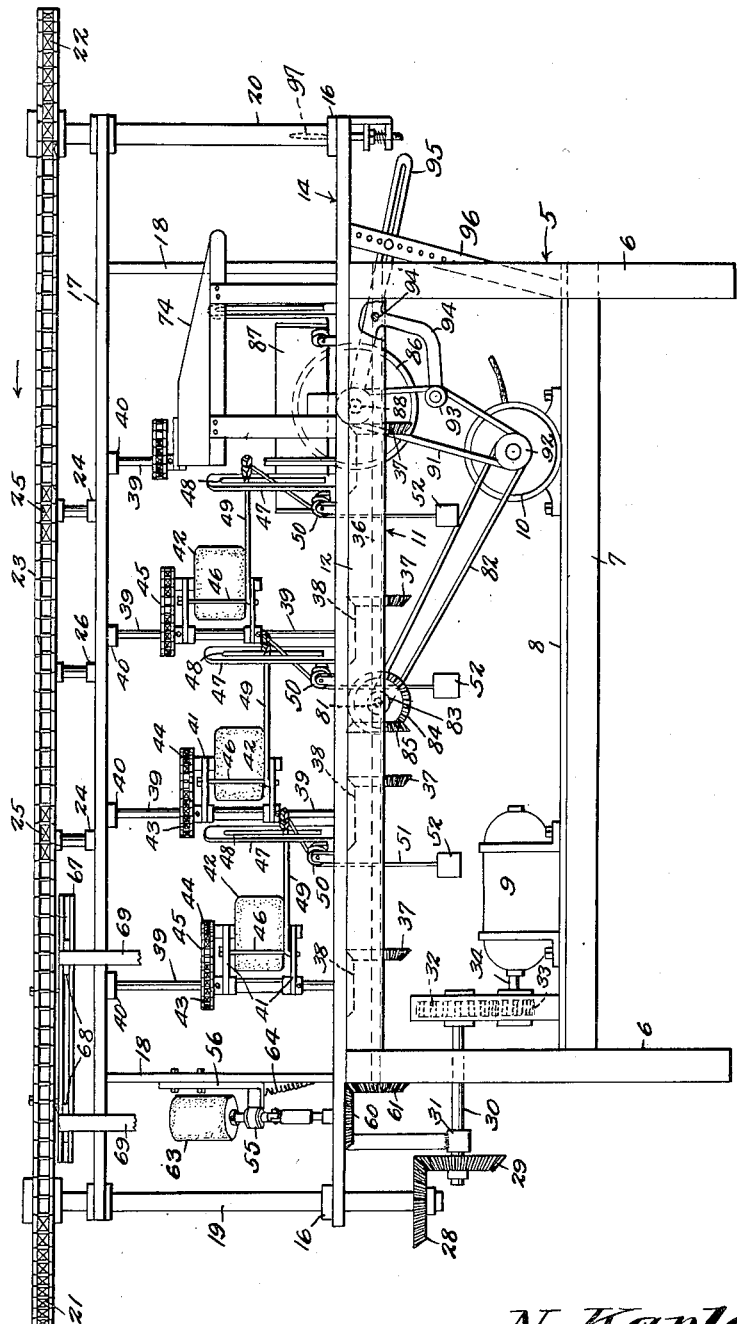
Fig. I.
Inventor
N. Kaplan
By Attorneys March 18, 1952　　　N. KAPLAN　　　2,589,701
FISH CONVEYER
Filed April 9, 1947　　　　　　5 Sheets-Sheet 2
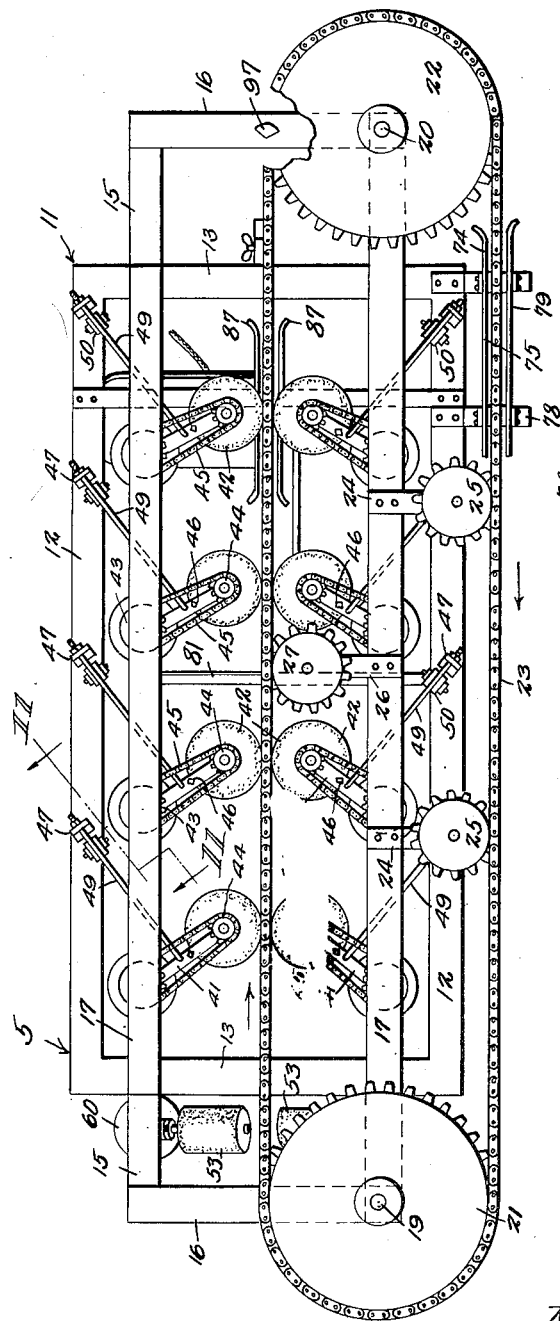
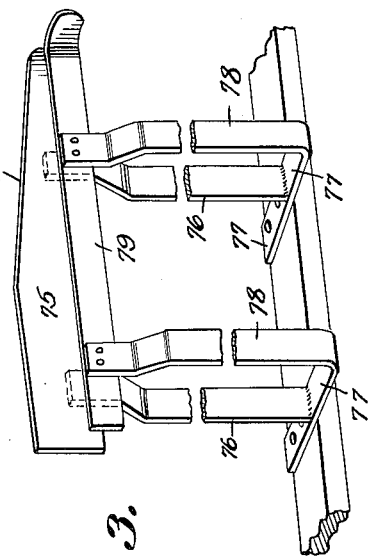
Inventor
N. Kaplan
By （signature）
Attorneys

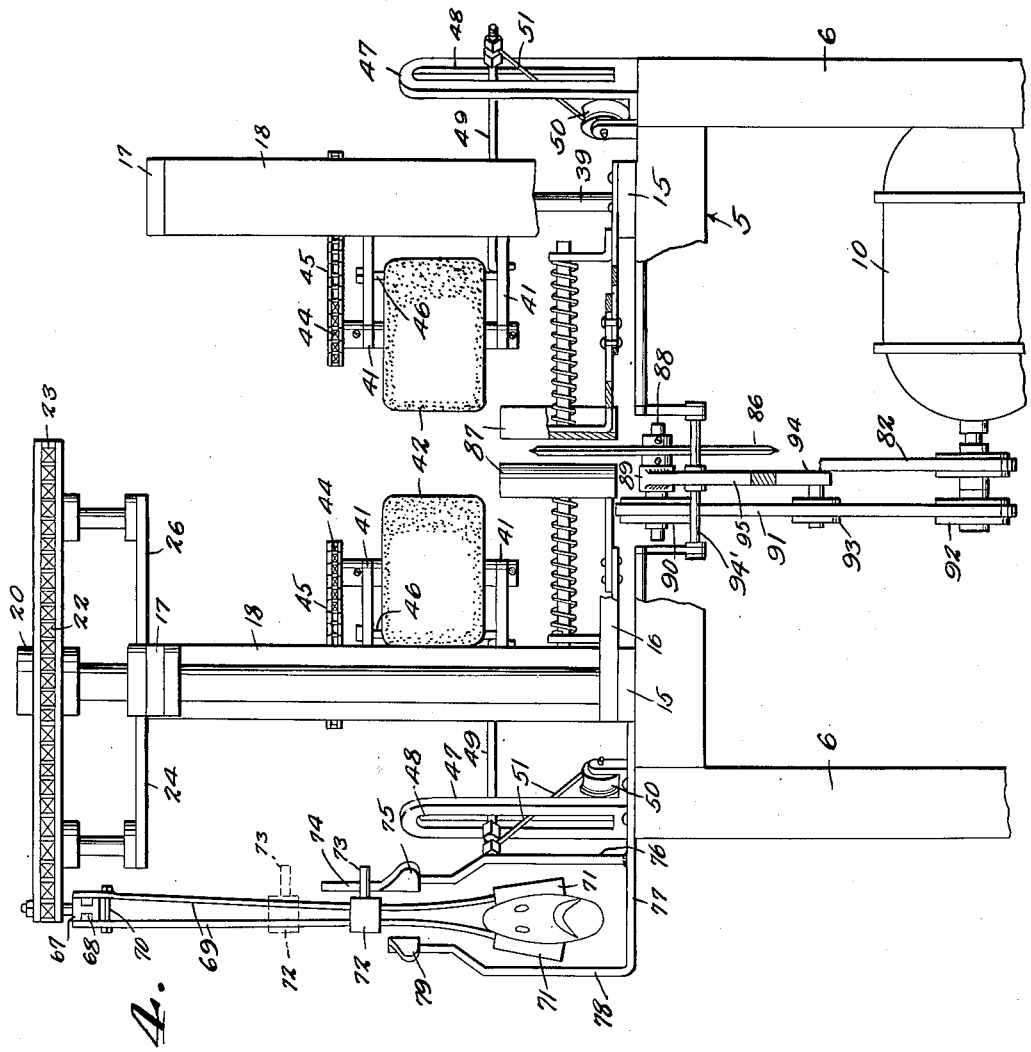

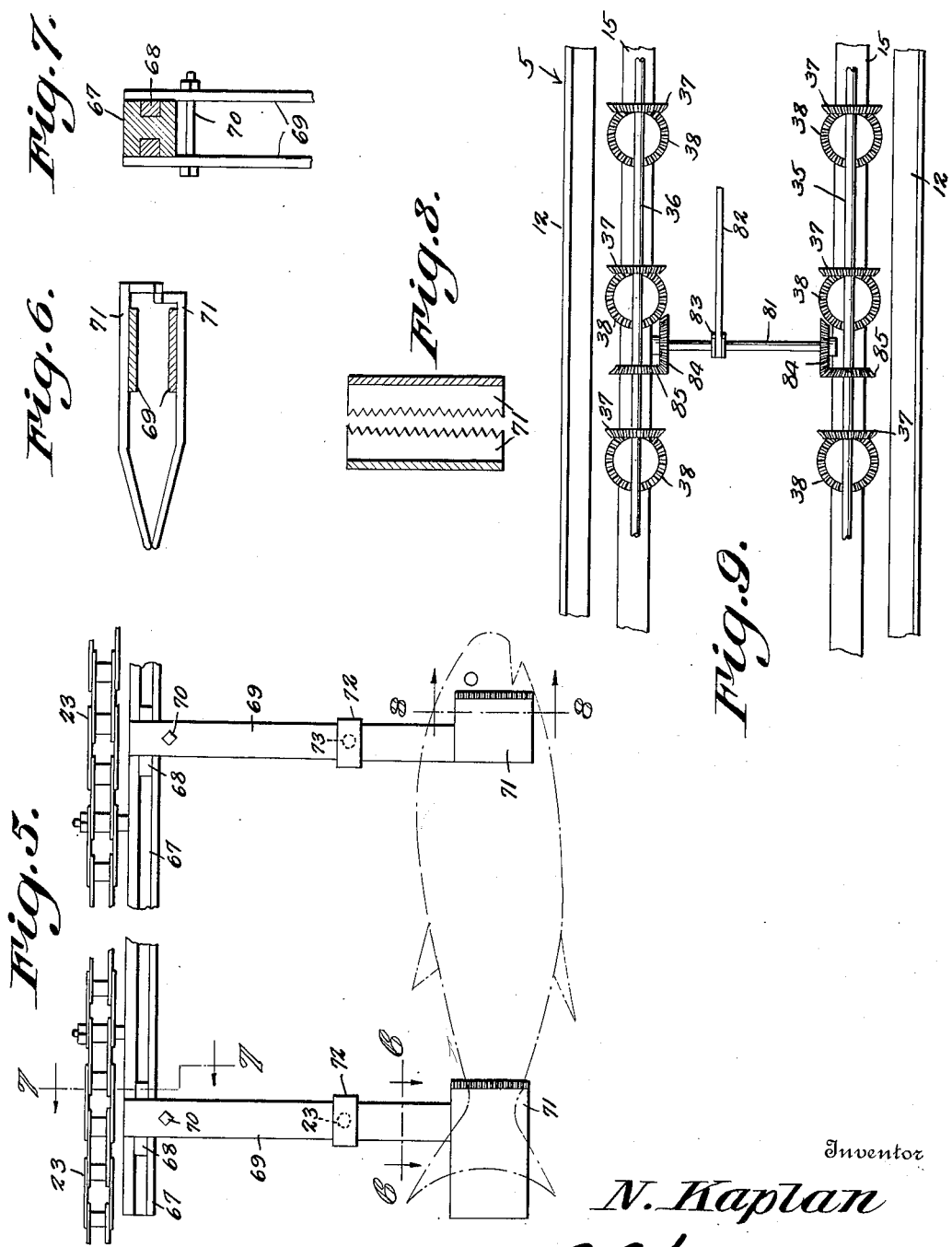

March 18, 1952 — N. KAPLAN — 2,589,701
FISH CONVEYER
Filed April 9, 1947 — 5 Sheets-Sheet 5
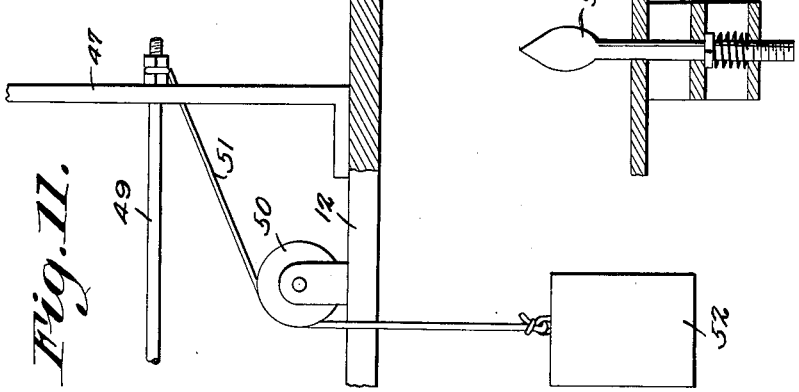
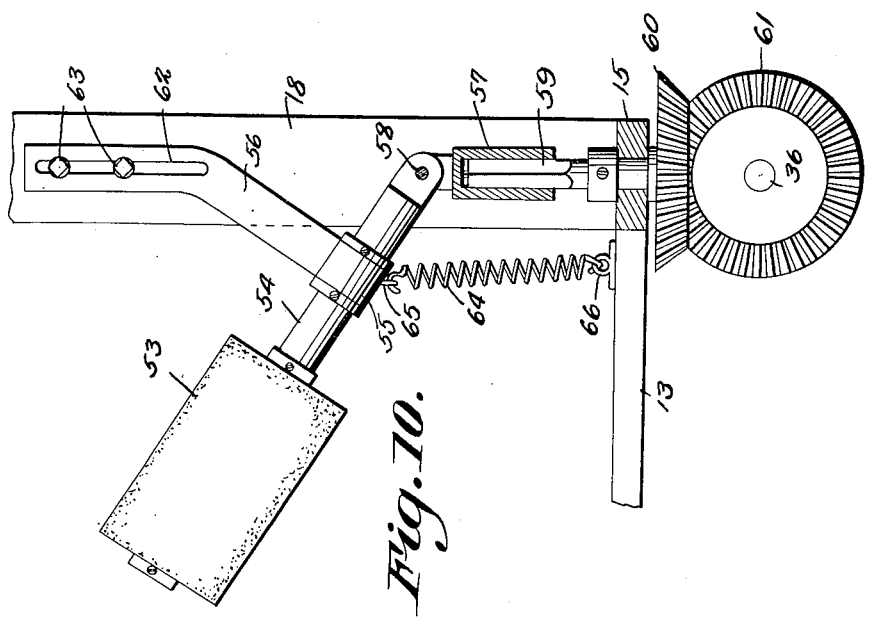
Inventor
N. Kaplan
By C. Knowles
Attorneys.

Patented Mar. 18, 1952

2,589,701

UNITED STATES PATENT OFFICE 2,589,701

FISH CONVEYER

Nathan Kaplan, Atlanta, Ga.

Application April 9, 1947, Serial No. 740,335

1 Claim. (Cl. 198—179)

This invention relates to a machine designed for scaling and cleaning fish, preparing fish for the market or use.

An important object of the invention is to provide a machine of this character embodying a conveying means having fish-gripping members adapted to convey the fish between scaling brushes, whereby the scales are moved therefrom.

Another object of the invention is to provide means whereby the scaling brushes may move laterally, thereby adapting the machine for use in treating fish of various sizes and shapes.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings

Figure 1 is an elevational view of a machine constructed in accordance with the invention.

Figure 2 is a plan view thereof.

Figure 3 is an enlarged perspective view illustrating the means for releasing the fish-clamps, to release the fish held thereby.

Figure 4 is an end elevational view of the machine, parts thereof having been broken away to illustrate in detail, certain elements of the machine.

Figure 5 is an enlarged elevational view illustrating the fish-clamping members in their fish-clamping positions, the fish being shown in dotted lines in Figure 5.

Figure 6 is a sectional view taken on line 6—6 of Figure 5.

Figure 7 is a sectional view taken on line 7—7 of Figure 5.

Figure 8 is a sectional view taken on line 8—8 of Figure 5.

Figure 9 is a view illustrating the power shafts and means for taking off power from the power shafts to operate the mechanism of the machine.

Figure 10 is an enlarged elevational view illustrating one of the scaling brushes.

Figure 11 is a sectional view taken on line 11—11 of Figure 2.

Figure 12 is an elevational view of the eviscerator forming a part of the machine.

Referring to the drawings in detail, the machine forming the subject matter of the present application, comprises a support including the bench 5 which comprises an open frame, supported by means of the legs 6, the legs being connected by means of bars 7 at the points intermediate the ends thereof, which bars provide supports for the platform 8, on which the motors 9 and 10 are mounted.

The bench also includes a rectangular frame 11 which includes parallel side bars 12 and end bars 13 connecting the bars 12.

As clearly shown by Figure 1 of the drawings, the rectangular frame 11 extends to points flush with the top of the bench 5.

Mounted on the bench, is a rectangular frame 14 including parallel side bars 15, connected at their ends by means of the bars 16. Directly above the rectangular frame 14, is a rectangular frame 17, the frames 14 and 17 being so constructed that they extend beyond the ends of the bench. The frames 14 and 17 are held in spaced relation with respect to each other, by means of the standards 18 arranged adjacent to the ends of the rectangular frames, the rectangular frames being formed with bearing openings to receive the vertical shafts 19 and 20, the upper ends of which extend above the frame 17, where they are supplied with sprockets 21 and 22 over which the carrier chain 23 operates. Extending laterally from the frame 17, are arms 24 that have upstanding shafts mounted thereon, on which the idle sprockets 25 operate, the sprockets also engaging the carrier chain 23 to hold the chain against sagging.

The reference character 26 indicates an arm that extends from the frame 17 in a direction opposite to the direction of the arms 24, the arm 26 providing a support for a vertical shaft on which the idle sprocket 27 operates, the sprocket 27 holding the opposite flight of the endless chain 23 against sagging.

The shaft 19 extends downwardly below the rectangular frame 14, where it is supplied with the beveled pinion 28 that meshes with the beveled pinion 29 that in turn is secured to the shaft 30 operating in the bearing 31, the shaft 30 being provided with a gear 32 at its opposite end, which is in mesh with the gear 33 mounted on one end of the motor shaft 34 whereby rotary movement of the motor shaft will produce a rotary movement of the shaft 30, through the gears 32 and 33. The shaft 19 will be rotated through the beveled pinions 28 and 29, transmitting movement to the endless carrier chain 23.

Operating in bearings formed in the bench 5, are parallel power shafts 35 and 36, the shafts 35 and 36 being arranged on opposite sides of the bench, as shown by Figure 9 of the drawings. These shafts 33 and 36 are provided with pinions 37 that are secured thereto, the pinions 37 meshing with the pinions 38 disposed on the lower ends of the shafts 39 which have their upper ends operating in bearings 40 secured to the under surface of the rectangular frame 17, as clearly shown by Figure 1 of the drawings.

Brush arms 41 are formed with openings that accommodate the shafts 39 in such a way that the arms 41 may move with respect to the shafts 39. These arms 41 provide supports for the vertical shafts on which the scaling brushes 42 operate, the arms and brushes being so arranged that the brushes 42 operate in pairs and in the path of travel of fish being carried through the machine on the endless carrier chain.

The shafts 39 are provided with sprockets 43 that are secured to the shafts 39 to rotate therewith, the sprockets 43 transmitting motion to the sprockets 44, by the chains 45.

The arms 41 of each pair, are connected by means of the bolts 46 which cause the pairs of arms to operate in unison.

Arranged in spaced relation along the side members of the frame 14, are vertical guide bars 47 which are formed with elongated openings 48 in which the outer ends of the rods 49 operate, the inner ends of the rods 49 being formed with downwardly extended portions that fit in openings formed in the lower arms of each pair of arms 41, so that movement of the rods 49, will act to swing the pairs of rods and brushes supported thereby in a horizontal plane.

Adjacent to each guide bar 47, is a roller 50 over which the flexible connecting members 51 operate, the flexible connecting members being connected with the weights 52. Since the rollers 50 are offset with respect to the ends of the rods 49, the natural tendency of the weights is to urge the arms inwardly, causing the brushes 42 to operate in close proximity with respect to each other and at the same time provide a brush structure wherein the brushes will spread as a fish is moved therebetween, the spreading of the brushes at the same time insuring pressure being directed to the sides of the fish to remove the scales therefrom.

The endless carrier chain 23 operates in an anti-clockwise direction, as indicated by the arrows in Figure 2 of the drawings, and at the front end of the bench, are arranged scaling brushes 53 which brushes are mounted on the outer ends of the shafts 54 that operate in bearings 55 formed at the lower ends of the vertically adjustable arms 56, mounted on the standards 18, at one end of the bench.

The shafts 54 are disposed at acute angles with respect to the standards 18, and are so arranged with respect to the endless carrier chain 23, that they will rest on the backs of fish supported within the fish clamps of the device, to remove the scales from the backs of the fish prior to the movement of the fish through the machine.

As clearly shown by Figure 10 of the drawings, the shaft 54 is connected with the hollow shaft 57 by means of the universal connection 58. The shaft 57 is formed with a squared inner surface adapted to accommodate the squared shafts 59 mounted in bearings formed in the bench, the shafts 59 being provided with beveled pinions 60 on the lower ends thereof, which beveled pinions mesh with the beveled pinions 61 mounted on the forward ends of the shafts 35 and 36, so that rotary movement of the shafts 35 and 36, will also operate to rotate the shafts 54 and consequently, the brushes 53 mounted thereon.

The arms 56 are formed with elongated openings 62 that receive the bolts 63 so that the arms 56 may slide vertically to adjust the brushes for use in scaling fish of various sizes.

Coiled springs 64 have their upper ends connected with the hooks 65 extending from the lower ends of the arms 56, while the opposite ends of the springs 64 connect with the bench, through the eyes 66. Thus, it will be seen that due to this construction, the brushes 53 are tensioned and held into close engagement with the fish passing through the machine, the vertical movement of the hollow shaft 57, compensating for the vertical adjustment of the shafts 54 and brushes 53.

The clamps used in clamping the fish to the endless carrier chain, include a bar 67 formed with longitudinal grooves in the side edges thereof, the grooves accommodating the blocks 68 that are secured to the clamp arms 69, the clamp arms being held in position on the bars 67, by means of the bolts 70 which pass through openings in the clamp arms 69 as clearly shown by Figure 4 of the drawings.

These clamp arms are constructed of spring metal, and have jaws 71 formed at their lower ends, the jaws having teeth adapted to bite into the fish to secure the fish to the jaws.

Sleeves 72 move over the clamp arms, and since the clamp arms are curved outwardly adjacent to their lower or free ends, because of the fish held between the jaws, it will be seen that as the sleeves move over the outwardly inclined ends of the arms 69, pressure will be exerted on the arms to force the jaws thereof into the body of the fish.

Extending from the sleeves 72, are pins 73, which pins are adapted to move over the inclined edge 74 elevating the sleeves to allow the clamp arms to move outwardly releasing the jaws from the fish held therebetween.

The member 75 which is formed with the inclined edge 74, is mounted on the upper end of the arm 76 which is welded to the horizontal arm 77 secured to the frame of the bench. The arm 77 has an upwardly extended end 78 which has a curved blade 79 cooperating with the member 75 in guiding the clamps therebetween. The power shafts 35 and 36 are operated by the motor 10 mounted on the platform 8, at one end of the bench, the rotary movement of the motor 10 being directed to the horizontal shaft 81, through the medium of the belt 82 which operates over the pulley 83, secured to the shaft 81.

Pinions 84 are secured to the ends of the shaft 81 and mesh with the pinions 85 secured to the shafts 35 and 36.

Disposed above the motor 10 is the rotary cutting blade 86 that operates between the spring pressed guides 87, so that fish moved directly over the blade 86, will be gripped by the guides and held during the cutting of the fish throughout the length of the belly of the fish.

The blade 86 is mounted on the shaft 88 that in turn operates in the bearing 89, carried at the inner end of the lever 95 which is pivotally mounted at 94', the shaft 88 having a pulley 90 secured thereto, over which the belt 91 operates, the belt 91 also operating over the pulley 92 secured to the shaft of the motor 10. An idle pulley 93 engages the belt 91, to tighten the belt 91 and cause the operation of the cutting blade 86 at the proper time.

As clearly shown by Figure 1 of the drawings, the idle pulley 93 is mounted at the free end of the arm 94, which is connected with the lever 95, so that the operator may by elevating the lever 95 increase the pressure on the belt 91.

Openings are provided in the bar 96 over which the lever 95 operates, the openings being designed to receive a pin or bolt which moves in the elongated opening of the lever 95, to secure the lever 95 in various positions of adjustment, should it be desired to adjust the rotary cutting blade for cutting fish of various sizes.

Mounted on the frame 14, in direct line with the rotary cutting blade, is the eviscerator 97 which removes the entrails from the fish after the fish has been cut by the rotary blade 86.

It will, of course, be understood that an attendant will clamp the fish to the chain 23, by means of the clamp arms 69. The fish is then moved tail first, through the brushes which are rapidly rotated, the brushes removing the scales from the sides and back of the fish. As the fish proceeds towards the right hand end of the machine, the fish will move over the rotary cutting blade which will cut the fish through the length of its belly, and the fish will then move into contact with the eviscerator which will remove the entrails which drop downwardly therefrom. The fish may now be removed by the attendant and deposited in a suitable receiving tank or receptacle, not shown.

It will, of course, be understood that as the fish move towards the clamp operating mechanism shown by Figure 3 of the drawings, the pins of the sleeves move over the inclined surface 74, elevating the sleeves to allow the clamp arms to open and release the fish.

From the foregoing, it is believed that in view of the showing and description of applicant's invention, a further disclosure of the operation of the machine is unnecessary for a complete understanding of the invention.

What is claimed is:

For use with a machine having fish scaling and cleaning means, means for conveying fish through the machine to the scaling and cleaning means, comprising an endless chain, pairs of spring arms secured to and depending from said chain, the lower ends of said spring arms being spaced apart, cooperating jaws on the free ends of said arms adapted to grip the tail and head respectively of a fish, holding the fish in a horizontal position with the sides of the fish in vertical planes as said chain moves the fish into the scaling and cleaning means, sleeves slidable over the arms of each pair of arms holding the arms in clamped relation with fish positioned between the arms, pins extending from the sleeves, and a cam member disposed in the path of travel of said pins engaging the pins moving the sleeve longitudinally of the arms releasing the fish held therebetween.

NATHAN KAPLAN.

REFERENCES CITED

The following references are of record in the file of this patent:

UNITED STATES PATENTS

| Number | Name | Date |
|---|---|---|
| 928,172 | Bernardin | July 13, 1909 |
| 935,602 | Grub | Sept. 28, 1909 |
| 980,371 | Warner | Jan. 3, 1911 |
| 1,103,809 | Mischler | July 14, 1914 |
| 1,350,123 | Theodore | Aug. 17, 1920 |
| 1,645,600 | Kohler | Oct. 18, 1927 |
| 2,274,793 | Keating | Mar. 3, 1942 |
| 2,345,607 | Kaplan | Apr. 4, 1944 |